United States Patent
Del Gaizo et al.

(10) Patent No.: US 10,053,163 B1
(45) Date of Patent: Aug. 21, 2018

(54) VEHICLE AERODYNAMIC UNDERBODY ARRANGEMENT

(71) Applicant: GM GLOBAL TECHNOLOGY OPERATIONS LLC, Detroit, MI (US)

(72) Inventors: Steven A. Del Gaizo, Madison Heights, MI (US); William Fang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/638,900

(22) Filed: Jun. 30, 2017

(51) Int. Cl.
*B62D 35/02* (2006.01)
*B62D 37/02* (2006.01)
*B62D 25/16* (2006.01)

(52) U.S. Cl.
CPC ............ *B62D 37/02* (2013.01); *B62D 25/16* (2013.01); *B62D 35/02* (2013.01)

(58) Field of Classification Search
CPC ..... B62D 35/001; B62D 35/002; B62D 35/02
USPC ........ 280/851, 762; 296/180.1, 180.2, 180.3, 296/180.4, 180.5
See application file for complete search history.

(56) References Cited

U.S. PATENT DOCUMENTS

| | | | | |
|---|---|---|---|---|
| 3,743,343 A * | 7/1973 | Grote, Sr. | ............ | B62D 25/16 280/851 |
| 4,486,046 A * | 12/1984 | Whitney | ............. | B62D 35/001 280/851 |
| 4,511,170 A * | 4/1985 | Sankrithi | ............. | B62D 35/008 244/12.1 |
| 4,627,631 A * | 12/1986 | Sherman | ............. | B62D 25/168 280/851 |
| 4,640,541 A * | 2/1987 | FitzGerald | ........... | B62D 35/001 280/851 |
| 4,772,060 A * | 9/1988 | Kretschmer | ........... | B62D 35/02 296/180.1 |
| 5,322,340 A * | 6/1994 | Sato | ........................ | B62D 25/20 180/68.1 |
| 5,375,882 A * | 12/1994 | Koch, III | ............. | B62D 25/188 280/848 |
| 6,435,298 B1 * | 8/2002 | Mizuno | ................... | B62D 35/02 180/346 |
| 6,974,178 B2 * | 12/2005 | Ortega | ................. | B62D 35/001 296/180.1 |
| 7,854,469 B2 * | 12/2010 | Dayton | ................ | B62D 35/001 296/180.1 |
| 7,887,120 B2 * | 2/2011 | Boivin | ................. | B62D 35/001 180/903 |

(Continued)

*Primary Examiner* — Jeffrey J Restifo
(74) *Attorney, Agent, or Firm* — Quinn IP Law

(57) ABSTRACT

A vehicle includes a vehicle body having a first end configured to face oncoming airflow when the vehicle is in motion relative to a road surface and an opposing second. An underbody extends between the first and second ends of the vehicle body and defines a space between the vehicle body and the road surface and includes a first lateral edge, an opposing second lateral edge and a central region defined therebetween. One or more wheel wells are formed in the underbody proximate the front end of the vehicle body. At least one aerodynamic member is disposed adjacent the one or more openings in the underbody. The at least one aerodynamic member includes a leading portion positioned proximate the one or more openings, a trailing portion positioned proximate the central region of the underbody and at least one aerodynamic surface extending therebetween.

19 Claims, 3 Drawing Sheets

(56) References Cited

U.S. PATENT DOCUMENTS

| | | | | |
|---|---|---|---|---|
| 8,177,286 B2* | 5/2012 | Brown | ................ | B62D 25/168 |
| | | | | 280/851 |
| 8,186,745 B2* | 5/2012 | Graham | ............... | B62D 35/001 |
| | | | | 180/903 |
| 8,276,972 B2* | 10/2012 | Domo | ................... | B62D 35/02 |
| | | | | 296/180.1 |
| 8,297,685 B2* | 10/2012 | Wolf | ................... | B62D 35/005 |
| | | | | 296/180.1 |
| 8,366,178 B2* | 2/2013 | Yamagishi | ............. | B62D 35/02 |
| | | | | 180/903 |
| 8,376,450 B1* | 2/2013 | Long | ................... | B62D 35/001 |
| | | | | 296/180.4 |
| 8,783,758 B2* | 7/2014 | Baker | ................ | B62D 35/001 |
| | | | | 296/180.4 |
| 8,814,251 B2* | 8/2014 | Matsuyama | ........... | B62D 35/02 |
| | | | | 180/69.1 |
| 8,888,119 B2* | 11/2014 | Guetersloh | .............. | B60P 3/10 |
| | | | | 280/414.1 |
| 8,979,172 B2* | 3/2015 | Reiman | ................. | B62D 35/02 |
| | | | | 296/180.4 |
| 9,045,176 B1* | 6/2015 | Henderson, II | ........ | B62D 35/02 |
| 9,132,869 B2* | 9/2015 | Dayton | ................ | B62D 35/001 |
| 9,296,433 B2* | 3/2016 | Roush | ................ | B62D 35/001 |
| 9,440,689 B1* | 9/2016 | Smith | ................... | B62D 35/02 |
| 9,567,016 B2* | 2/2017 | Magee | ................... | B62D 35/02 |
| 9,688,320 B2* | 6/2017 | Courtney | ............. | B62D 35/001 |
| 9,688,321 B2* | 6/2017 | Dominguez | .......... | B62D 37/02 |
| 9,809,260 B2* | 11/2017 | Smith | ................. | B62D 35/001 |
| 9,849,923 B2* | 12/2017 | Caples | .................. | B62D 35/02 |
| 2009/0146453 A1* | 6/2009 | Ortega | ................ | B62D 35/001 |
| | | | | 296/180.4 |
| 2017/0057565 A1* | 3/2017 | Sarhadiangardabad | ................... | |
| | | | | B62D 35/02 |
| 2017/0129552 A1* | 5/2017 | Han | ...................... | B62D 35/02 |

* cited by examiner

VEHICLE AERODYNAMIC UNDERBODY ARRANGEMENT

INTRODUCTION

The present disclosure relates to an aerodynamic underbody arrangement for a vehicle.

Vehicle aerodynamic properties may be adjusted to both improve and reduce operational functions of the vehicle. For example, adjusting vehicle aerodynamics may reduce drag and wind noise while minimizing noise emission during vehicle operation. Adjusting vehicle aerodynamics may also be used to achieve downforce and improve vehicle traction and cornering abilities. Various types of components may be incorporated with vehicles, such as spoilers, air dams and the like, on different surfaces of the vehicle to adjust aerodynamic properties.

SUMMARY

A vehicle includes a vehicle body having a first end and an opposing second end. The first end of the vehicle is configured to face oncoming airflow when the vehicle is in motion relative to a road surface. An underbody extends between the first and second ends of the vehicle body. The underbody defines a space between the vehicle body and the road surface and includes a first lateral edge, an opposing second lateral edge and a central region defined therebetween. One or more wheel wells are formed in the underbody proximate the front end of the vehicle body.

At least one aerodynamic member is disposed adjacent the one or more wheel wells in the underbody. The at least one aerodynamic member includes a leading portion positioned proximate the one or more wheel wells, a trailing portion positioned proximate the central region of the underbody and at least one aerodynamic surface extending therebetween. The at least one aerodynamic surface directs the airflow from the one or more wheel wells to the central region to accelerate the airflow through the space between the vehicle body and the road surface to improve vehicle performance.

The vehicle further includes a frame cooperating with and supporting the vehicle body, one or more wheels rotatably connected to the frame and one or more wheel wells provided in the vehicle body corresponding with the one or more wheel wells in the underbody. The one or more wheels are received within the one or more wheel wells.

The at least one aerodynamic member may include a first strake disposed on the underbody. The first strake includes a housing having a leading portion positioned proximate the one or more wheel wells, a trailing portion positioned proximate the central region of the underbody and at least one aerodynamic surface extending therebetween. A second strake is disposed on the underbody and includes a housing having a leading portion positioned proximate the first strake, a trailing portion extending toward the central region of the underbody and at least one aerodynamic surface extending therebetween. The at least one aerodynamic surface of the second strake directs airflow from an area between the first strake and the second strake to the central region of the underbody to accelerate the airflow through the space between the vehicle body and the road surface to improve vehicle performance.

The at least one aerodynamic member may also include a third strake on the underbody opposite the first strake. The third strake includes a housing having a leading portion positioned proximate the one or more wheel wells, a trailing portion positioned proximate the central region of the underbody and at least one aerodynamic surface extending therebetween. A fourth strake is disposed on the underbody opposite the second strake and includes a housing having a leading portion positioned proximate the third strake, a trailing portion extending toward the central region of the underbody and at least one aerodynamic surface extending therebetween. The at least one aerodynamic surface of the fourth strake directs airflow from an area between the third strake and the fourth strake to the central region of the underbody to accelerate the airflow through the space between the vehicle body and the road surface to improve vehicle performance.

A diffuser assembly is disposed proximate the rear end of the vehicle body on the underbody. The diffuser assembly cooperates with the at least one aerodynamic member to accelerate the airflow pattern through the underbody. The at least one aerodynamic member is integrally formed into the underbody.

In another embodiment of the disclosure, a vehicle includes a vehicle body having a first end and an opposing second end. The first end of the vehicle is configured to face oncoming airflow when the vehicle is in motion relative to a road surface. An underbody extends between the first and second ends of the vehicle body. The underbody defines a space between the vehicle body and the road surface and includes a first lateral edge, an opposing second lateral edge and a central region defined therebetween. One or more wheel wells are formed in the underbody proximate the front end of the vehicle body.

A first strake is disposed on the underbody and includes a housing having a leading portion positioned proximate the one or more wheel wells, a trailing portion positioned proximate the central region of the underbody and at least one aerodynamic surface extending therebetween. A second strake is disposed on the underbody and includes a housing having a leading portion positioned proximate the first strake, a trailing portion extending toward the central region of the underbody and at least one aerodynamic surface extending therebetween. The at least one aerodynamic surface of the second strake directs airflow from an area between the first strake and the second strake to the central region of the underbody to accelerate the airflow through the space between the vehicle body and the road surface to improve vehicle performance.

The first and second strakes are integrally formed into the underbody. The vehicle further includes a frame cooperating with and supporting the vehicle body, one or more wheels rotatably connected to the frame, and one or more wheel wells provided in the vehicle body corresponding with the one or more wheel wells in the underbody. The one or more wheels are received within the one or more wheel wells.

A third strake may be provided on the underbody opposite the first strake. The third strake includes a housing having a leading portion positioned proximate the one or more wheel wells, a trailing portion positioned proximate the central region of the underbody, and at least one aerodynamic surface extending therebetween. A fourth strake is disposed on the underbody opposite the second strake and includes a housing having a leading portion positioned proximate the third strake, a trailing portion extending toward the central region of the underbody and at least one aerodynamic surface extending therebetween. The at least one aerodynamic surface of the fourth strake directs airflow from an area between the third strake and the fourth strake to the central region of the underbody to accelerate the airflow through the space between the vehicle body and the road surface to improve vehicle performance.

The third and fourth strakes are integrally formed into the underbody. A diffuser assembly is disposed proximate the rear end of the vehicle body on the underbody. The diffuser assembly cooperates with the at least one aerodynamic member to accelerate the airflow pattern through the underbody. The at least one aerodynamic member is integrally formed into the underbody.

In yet another embodiment of the disclosure, a vehicle includes a vehicle body having a first end and an opposing second end. The first end of the vehicle is configured to face oncoming airflow when the vehicle is in motion relative to a road surface. An underbody extends between the first and second ends of the vehicle body. The underbody defines a space between the vehicle body and the road surface and includes a first lateral edge, an opposing second lateral edge and a central region defined therebetween. One or more wheel wells are formed in the underbody proximate the front end of the vehicle body.

A first strake is disposed on the underbody and includes a housing having a leading portion positioned proximate the one or more wheel wells, a trailing portion positioned proximate the central region of the underbody, and at least one aerodynamic surface extending therebetween. A second strake is disposed on the underbody and includes a housing having a leading portion positioned proximate the first strake, a trailing portion extending toward the central region of the underbody, and at least one aerodynamic surface extending therebetween.

The at least one aerodynamic surface of the second strake directs airflow from an area between the first strake and the second strake to the central region of the underbody to accelerate the airflow through the space between the vehicle body and the road surface to improve vehicle performance. A diffuser assembly is disposed proximate the rear end of the vehicle body on the underbody. The airflow from at least one aerodynamic surface of the second strake is directed from the central region of the underbody to the diffuser assembly to accelerate the airflow through the space between the vehicle body and the road surface to improve vehicle performance.

The first and second strakes are integrally formed into the underbody. The vehicle further includes a frame cooperating with and supporting the vehicle body, one or more wheels rotatably connected to the frame and one or more wheel wells provided in the vehicle body corresponding with the one or more wheel wells in the underbody. The one or more wheels are received within the one or more wheel wells.

A third strake may be provided on the underbody opposite the first strake. The third strake includes a housing having a leading portion positioned proximate the one or more wheel wells, a trailing portion positioned proximate the central region of the underbody, and at least one aerodynamic surface extending therebetween. A fourth strake is disposed on the underbody opposite the second strake and includes a housing having a leading portion positioned proximate the third strake, a trailing portion extending toward the central region of the underbody and at least one aerodynamic surface extending therebetween. The at least one aerodynamic surface of the fourth strake directs airflow from an area between the third strake and the fourth strake to the central region of the underbody to accelerate the airflow through the space between the vehicle body and the road surface to improve vehicle performance.

The third and fourth strakes are integrally formed into the underbody. The diffuser assembly includes a panel that cooperates with at least one aerodynamic member to accelerate the airflow pattern through the underbody to generate a downforce on the vehicle to improve the aerodynamic profile of the vehicle body.

The above features and advantages and other features and advantages of the present disclosure are readily apparent from the following detailed description of the best modes for carrying out the disclosure when taken in connection with the accompanying drawings.

DETAILED DESCRIPTION

Figure 1:
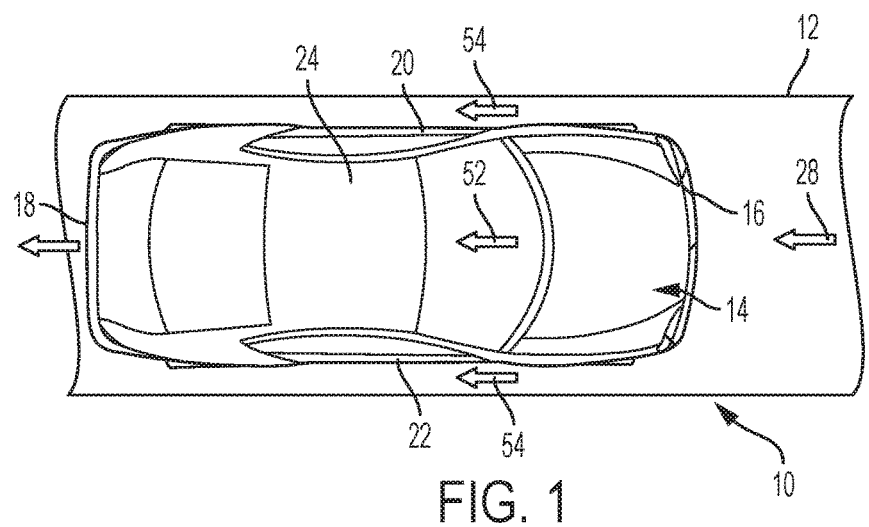
FIG. 1 is a schematic top view of a vehicle having an aerodynamic underbody arrangement in accordance with the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Referring to the drawings, wherein like reference numbers correspond to like or similar components throughout the several Figures, an example vehicle 10 is shown schematically in FIG. 1. The vehicle 10 may include, but not be limited to, a commercial vehicle, industrial vehicle, passenger vehicle, aircraft, watercraft, train or any mobile platform. It is also contemplated that the vehicle may be any mobile platform, such as an airplane, all-terrain vehicle (ATV), boat, personal movement apparatus, robot and the like to accomplish the purposes of this disclosure.

Figure 2:
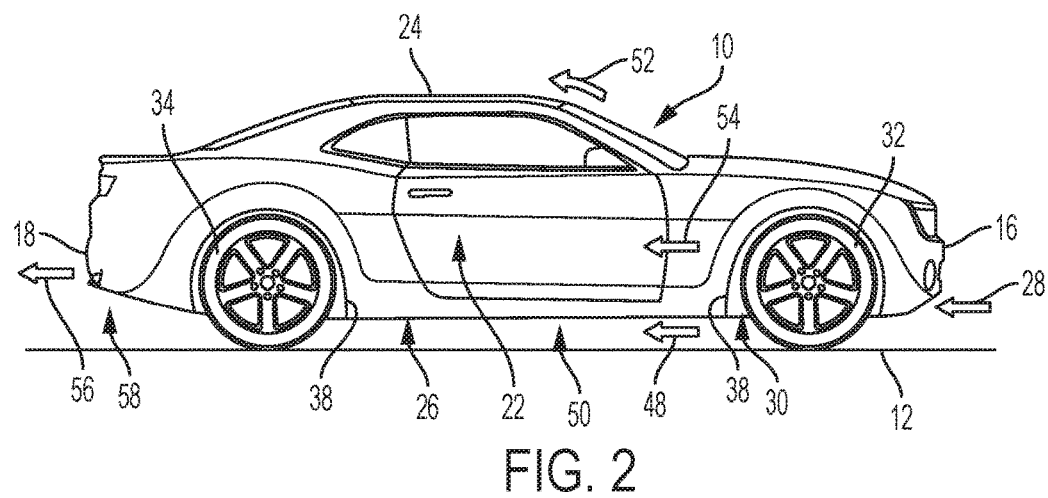
FIG. 2 is a schematic side view of the vehicle shown in FIG. 1.

The vehicle 10 in FIG. 1 is positioned relative to a road surface 12. The vehicle 10 includes a vehicle body 14. The vehicle body 14 defines six body sides. The six body sides include a first end or front end 16, an opposing second end or rear end 18, a first lateral portion or left side 20 generally extending between the first and second ends 16, 18, and an opposing second lateral portion or right side 22. The vehicle body 14 further includes a top body portion 24, which may include a vehicle roof portion, and an opposing lower body portion or underbody 26 as shown in FIG. 2. As understood by those skilled in the art, the first or front end 16 may be configured to face oncoming ambient airflow 28 when the vehicle 10 is in motion relative to the road surface 12.

The vehicle 10 includes a frame 30 cooperating with and supporting the vehicle body 14. The frame 30 supports a first set of one or more wheels 32 disposed proximate the first or front end 16 of the vehicle 10 and a second set of one or more wheels 34 disposed proximate the second or rear end 18 of the vehicle 10. As shown in FIG. 1, the first set of one or more wheels 32 includes a pair of front wheels that are rotatably connected to the frame 30 and rotate about an axis while the second set of one or more wheels 34 includes a pair of rear wheels that are rotatably connected to the frame 30 and rotate about an axis.

As shown in FIG. 2, the underbody 26 may generally extend or span a distance between the first and second ends 16, 18 of the vehicle body. The underbody 26 may include one or more wheel wells or openings 38 formed therein. As shown in the Figures, the one or more openings may include one or more wheel wells 38 provided in the vehicle body 14. The wheel wells 38 are sized to receive a portion of the wheels 32, 34 mounted on the frame 30 of the vehicle 10.

Figures 4, 5:
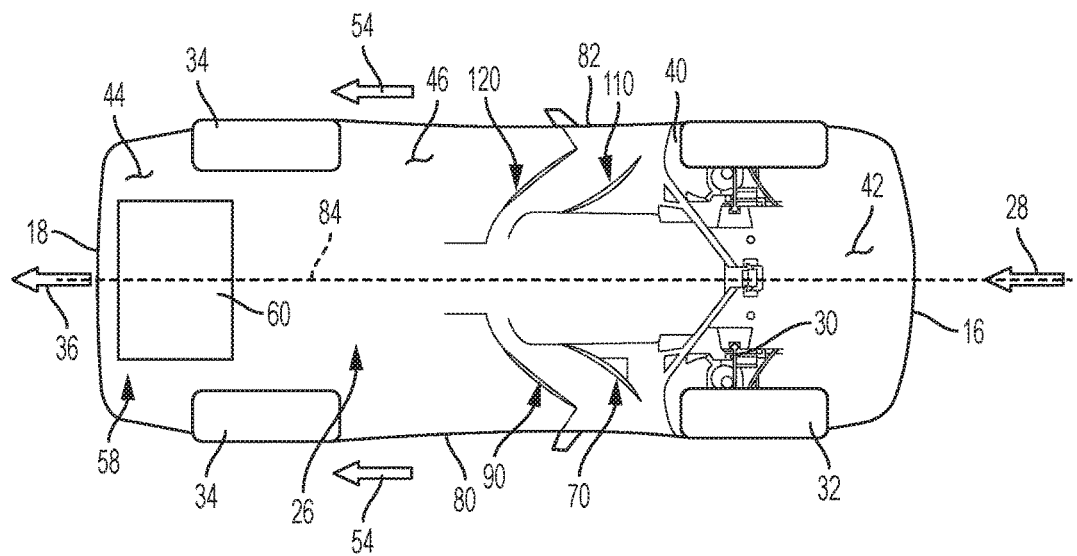
FIG. 4 is a schematic bottom view of the underbody of the vehicle shown in FIG. 1 incorporating at least one aerodynamic member in accordance with the present disclosure.
FIG. 5 of the underbody of the vehicle shown in FIG. 4 incorporating at least one aerodynamic member.

Referring additionally to FIG. 4, the underbody 26 of the vehicle may be defined by one or more regions extending between the first or front and second or rear body ends. A forward underbody portion 42 may be defined as an area of the underbody 26 generally extending between the first or front end 16 of the body 14 and the one or more front wheel 32. A rearward underbody portion 44 may be defined as an area of the underbody 26 generally extending between the one or more rear wheels 34 and the second or rear end 18 of the body 14. A middle underbody portion 46 may be defined as an area of the underbody 26 between the forward underbody portion 42 and rearward underbody portion 44. Alternatively, the middle underbody portion 46 may be defined as an area of the underbody 26 generally extending between the one or more front wheels 32 and one or more rear wheels 34 of the vehicle 10. It is understood that the underbody regions described herein may also be configured in alternative configurations based upon the configuration of the vehicle 10.

The underbody 26 may include substantially flat surface portion. Components of various vehicle sub-systems, for example of an engine exhaust system and a vehicle suspension, may also be disposed or positioned into specially formed passages on the underbody 26. A first airflow portion 48 may flow past the vehicle body 14 with limited disturbance. The underbody 26 may also define a space 50 between the vehicle body 14 and the road surface 12. Accordingly, the space 50 permits the first airflow portion 48 to pass under the vehicle body 14, between the vehicle body 14 and the road surface 12, while a second airflow portion 52 passes over the top body portion 24.

Furthermore, a third airflow portion 54 passes around the left and right sides 20, 22 of the vehicle body 14. The airflow portions 48, 52, 54 rejoin behind the second end 18 in a wake area or recirculating airflow region 56 immediately behind the rear end 18 of the moving vehicle 10. As understood by those skilled in the art, the recirculating airflow region 56 is generally caused at elevated vehicle speeds by the flow of surrounding air around the body sides 20, 22, 24, and 26 of the vehicle 10.

The vehicle 10 may also include a diffuser assembly 58 disposed proximate the rear end 18 of the vehicle body 14 on the rearward underbody portion 44. The diffuser assembly 58 may be configured to control the first airflow portion 48 past the underbody portion 26 through the space 50 and out to the ambient environment. The diffuser assembly 58 may include a panel 60 that may be configured to selectively extend into and retract from the ambient airflow in the recirculating airflow region 56 when the vehicle 10 is in motion relative to the road surface 12. The panel 60 may be formed from a suitably rigid but low mass material, such as an engineered plastic or aluminum. The panel 60 may enhance the aerodynamic profile of the vehicle body 14 by providing a degree of "wake infill" whereby the recirculating airflow region 56 is filled immediately behind the moving vehicle.

Figure 3:
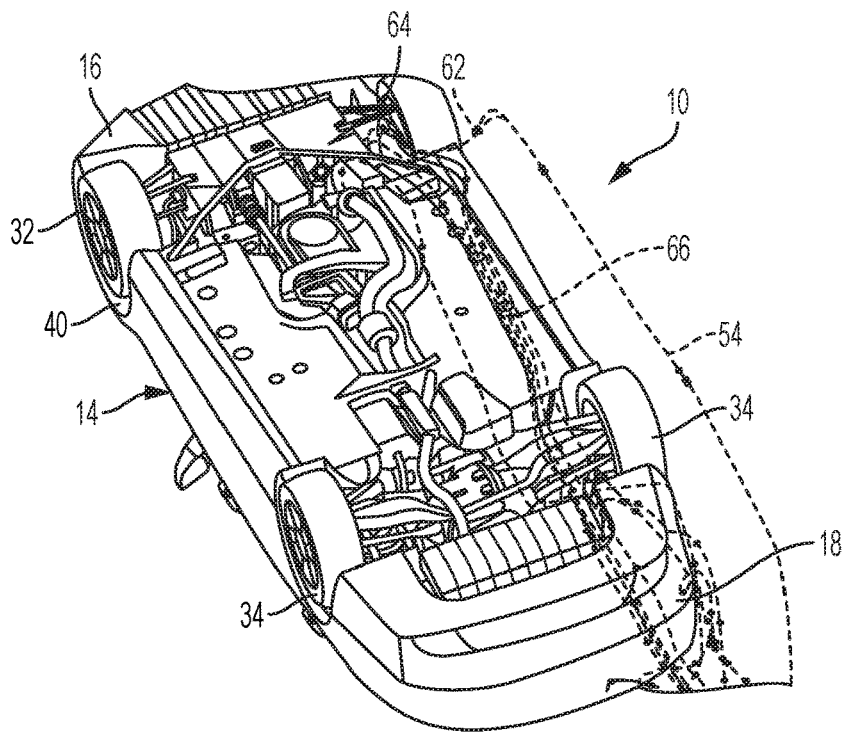
FIG. 3 is a perspective view of the underbody of the vehicle illustrating an aerodynamic airflow pattern across the underbody in an exemplary vehicle arrangement.

Referring to FIGS. 2 and 3, a standard air flow circulation path for a vehicle 10 in movement relative to the road surface 12 in illustrated. As is illustrated in FIGS. 2 and 3, the first airflow portion 48, travels or passes beneath the underbody 26 of the vehicle 10 through the space between the road surface 12 and the vehicle 10 while a portion of the first airflow portion as referenced by numeral 62 exits from the space below the underbody 26 to travel along the third airflow portion, generally represented by flow pattern 54. The third airflow portion 54 travels along a side 20 of the vehicle 10.

A substantial portion of the first airflow portion 48, as represented by the flow pattern 64 may circulate in and around the wheel well 38 and engine compartment (not shown) and the one or more front wheels 32 as the vehicle 10 travels relative to the road surface 12. The flow pattern 64 of the first airflow portion 48 may exit the wheel well 38 and travel along the underbody 26 generally proximate a lateral edge of the underbody 26 towards the rear end 18 of the vehicle body 14 as represented by flow pattern 66.

Figure 6:
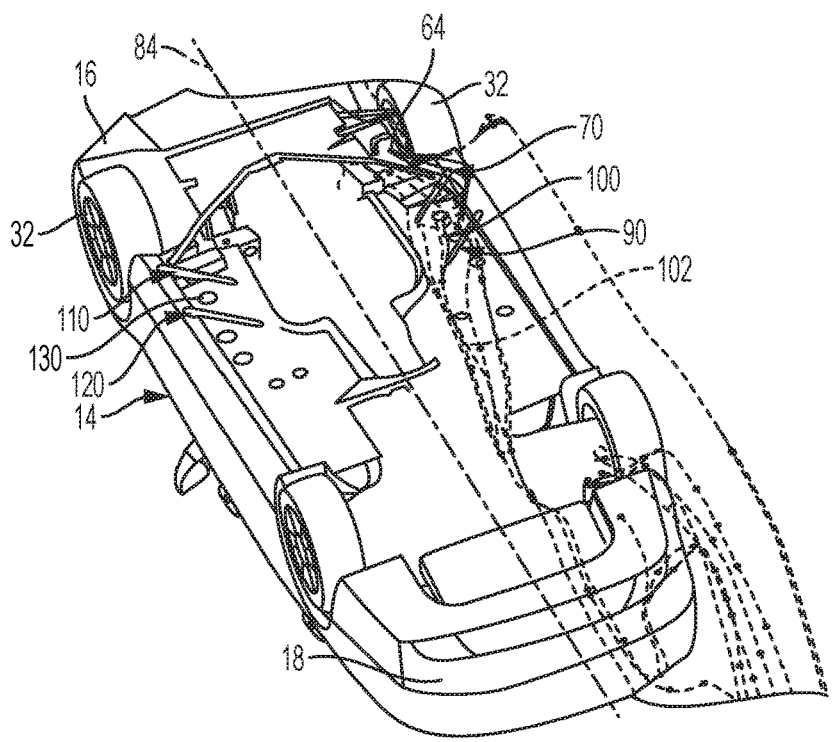
FIG. 6 is a perspective view of the underbody of the vehicle illustrating an adjusted aerodynamic airflow pattern across the underbody in response to incorporation of the at least one aerodynamic member of the present disclosure.

Referring now to FIGS. 4-6, a modified underbody arrangement for the vehicle 10 illustrated. The vehicle 10 includes at least one aerodynamic member or strake 70 disposed on the underbody 26 of the vehicle body 14. The at least one aerodynamic member or strake 70 may be integrally formed as part of the underbody 26 or may be releasably or fixedly mounted to a portion of the underbody 26. In one embodiment, the at least one aerodynamic member extends about 20 millimeters (mm) from the surface of the underbody 26. The at least one aerodynamic member 70 includes a housing 72 incorporating one or more aerodynamic surfaces, generally referenced by numeral 74.

As will be described in greater detail below, the one or more aerodynamic surfaces 74 of the at least one aerodynamic member 70 cooperates with the underbody and/or other vehicle features such as the diffuser assembly 58, to adjust aerodynamic characteristics for operation of the vehicle 10. Aerodynamic characteristics may include, but are not limited to, controlling the flow of airflow along the underbody 26 of the vehicle in the space 50 between the vehicle 10 and road surface 12 or adjusting the stabilizing effect of the vehicle 10.

As shown in FIGS. 4-6, the at least one aerodynamic member 70 disposed on the underbody 26 of the vehicle 10 includes a first aerodynamic member or strake 70 positioned proximate a first opening 38 or wheel well. In one non-limiting embodiment, an opposing strake or aerodynamic member or strake 110 may be disposed generally opposite the first strake 70 on the underbody 26 and positioned proximate a second opening or wheel well 40. As discussed above, the number of aerodynamic members, positioning of the aerodynamic members and shape of the aerodynamic member housing may be adjusted to achieve or improve one or more vehicle operating parameters.

In one non-limiting example shown in FIGS. 4-6, the housing 72 of the first strake 70 may be integrally formed in the underbody 26 proximate a rear edge of the opening or wheel well 38. The at least one aerodynamic surface 74 of the housing 72 of the first strake 70 includes a leading portion 76 positioned proximate a first lateral edge generally referenced by numeral 80 of the underbody 26 and proximate the rear edge of the wheel well 38.

It is appreciated that the underbody 26 may have a variety of configurations. In one non-limiting example, the underbody 26 includes a first lateral edge 80, an opposing second lateral edge 82 and a central region 84 formed therebetween. A trailing portion 78 of the at least one aerodynamic surface 74 of the first strake 70 extends toward the generally central region 84 of the underbody 26 and the at least one aerodynamic surface 74 extending therebetween. The at least one aerodynamic surface 74 of the first strake 70 may be shaped as a cambered airfoil. However, it is understood that a variety of shapes and configurations may be used for the housing 72, at least one aerodynamic surface 74 and leading and trailing portions of the first strake 70 to achieve one or more purposes of the disclosure.

As the first airflow portion 64 rotating in wheel well 38 exits from the rear edge of the wheel well 38 and engine compartment (not shown), the at least one aerodynamic surface 74 of the first strake 70 directs the first airflow portion 64 from the leading portion 76 of the aerodynamic surface 74 toward the trailing portion 78 disposed adjacent the central region 84 of the underbody 26. As the first airflow portion 64 reaches the trailing portion 78 of the strake 70, the resultant effect of the shape of the at least one aerodynamic surface 74 of the strake 70 creates a low-pressure area or vortex effect for the first airflow portion that continues to draw airflow from the wheel well 38 and engine compartment of the vehicle 10 as is best illustrated in FIG. 5. The opposing strake 110 disposed adjacent wheel well 40 may be configured with a similar arrangement to achieve a similar result.

Referring back to FIG. 4, the at least one aerodynamic member 70 disposed on the underbody 26 of the vehicle 10 further includes a second strake 90. The second strake 90 may be disposed on the underbody 26 adjacent the first strake 70. In one non-limiting example shown in FIG. 4, the housing 92 of the second strake 90 may be integrally formed in the underbody 26 proximate a portion of the housing 72 of the first strake 70. The housing 92 of the second strake includes at least one aerodynamic surface 94. The aerodynamic surface 94 complements the operation of the first strake 70.

In one non-limiting example, a leading portion 96 of an aerodynamic surface 94 of the housing 72 of the first strake 70 is positioned proximate the lateral edge 80 of the underbody 26 and proximate the housing 72 of the first strake 70 while a trailing portion 98 of the aerodynamic surface 94 of the second strake 90 extends toward a generally central region 84 of the underbody 26. As shown in the Figures, the positioning of the first strake 70 and second strake 90 on the underbody 26 create a region 100 wherein the first airflow portion travels during operation of the vehicle 10. As with the first strake 70, it is understood that a variety of shapes and configurations may be used for the housing 92, at least one aerodynamic surface 94, leading portion 96 and trailing portion 98 of the second strake 90 to achieve one or more purposes of this disclosure.

The at least one aerodynamic surface 94 of the second strake 90 draws the first airflow portion from the leading portion 96 of the surface 94 of the second strake 90 toward the trailing portion 98 disposed adjacent the central region 84 of the underbody 26. As the first airflow portion reaches the trailing portion 98 of the second strake 90, the first airflow portion is directed toward the rear end 18 of the body 14 of the vehicle as generally represented by airflow pattern 102.

As shown best in FIG. 6, the airflow pattern 102 travels generally proximate the central region 84 of the middle underbody portion 46 toward the rearward underbody portion 44. In one non-limiting embodiment, the panel of the diffuser assembly may be disposed on the rearward underbody portion 44 and configured to receive the airflow pattern 102 from the second strake 90. The diffuser assembly may cause the airflow pattern 102 upstream of the panel to accelerate through the underbody 26, thus generating a downforce and an attendant drag reduction on the vehicle body 14 thereby enhancing the aerodynamic profile of the vehicle body 14 to improve vehicle efficiency.

The enhanced aerodynamic profile of the vehicle body 14 may provide a benefit with respect to fuel economy in a vehicle powered by an internal combustion engine and/or with respect to the noise level being perceived by the occupants of vehicle 10. Extending the panel for a predetermined distance past the rear end 18 of the vehicle 10 such that the extension of the panel provides the desired aerodynamic benefit, such as drag reduction on the vehicle body 14.

It is understood that the vehicle may include a second set of strakes, such that the opposing strake 110 to the first strake 70 may be a third strake 110 disposed adjacent the second lateral edge 82 and the one or more openings of wheel well 40 may further include an opposing fourth strake 120 to the second strake 90 that cooperates with the third strake 110 to channel the airflow from rear edge 82 of opening of wheel well 40 toward the rear end 18 of the vehicle body 14 and/or a diffuser assembly to improve vehicle performance.

For example, as shown in FIGS. 4-6, the opposing strake may include a third strake 110 that may be disposed on the underbody 26 opposite the first strake 70. The third strake 110 includes a housing 112 having a leading portion 114 positioned proximate the one or more openings of the wheel well 40, a trailing portion 116 positioned proximate the central region 84 of the underbody 26 and at least one aerodynamic surface 118 extending therebetween.

A fourth strake 120 may disposed on the underbody 26 opposite the second strake 90 and proximate the third strake 110. The fourth strake 120 includes a housing 122 having a leading portion 124 positioned proximate the third strake 110, a trailing portion 126 extending toward the central region 84 of the underbody 26 and at least one aerodynamic surface 128 extending therebetween. The at least one aerodynamic surface 128 of the fourth strake 120 may direct airflow from an area 130 between the third strake 110 and the fourth strake 120 to the central region 84 of the underbody 26 to accelerate the airflow through the space 50 between the vehicle body 14 and the road surface 12 to improve vehicle performance. It is also contemplated that the third and fourth strakes 110, 120 may cooperate with diffuser assembly 58 if provided on the underbody 26 of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    a vehicle body having a first end and an opposing second end, wherein the first end is configured to face oncoming airflow when the vehicle is in motion relative to a road surface;
    an underbody extending between the first and second ends of the vehicle body and defining a space between the vehicle body and the road surface, the underbody including a first lateral edge, an opposing second lateral edge and a central region defined therebetween;
    one or more wheel wells provided in the underbody proximate the first end of the vehicle body; and
    at least one aerodynamic member disposed on the underbody adjacent the one or more wheel wells proximate the first end of the vehicle body, the at least one aerodynamic member including:
        a first strake disposed on the underbody including a housing having a leading portion positioned proximate the first lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent to the first strake to draw airflow from the first end of the vehicle body and the one or more wheel wells,
        a second strake disposed on the underbody adjacent to the first strake, the second strake including a housing having a leading portion positioned proximate the first lateral edge of the underbody and adjacent the first strake, a trailing portion extending toward the central region of the underbody and at least one aerodynamic surface extending between the leading portion and the trailing portion, wherein the first strake and the second strake cooperate to define a region therebetween receiving the airflow from the at least one aerodynamic surface of the first strake,
        wherein the at least one aerodynamic surface of the second strake directs the airflow from the first strake and the region between the first strake and the second strake to the trailing portion of the second strake toward the second end of the vehicle.

2. The vehicle of claim 1 wherein the at least one aerodynamic member further comprises:
    a third strake disposed on the underbody opposite the first strake, the third strake including a housing having a leading portion positioned proximate the second lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent the third strake to draw airflow from the first end of the vehicle body and the one or more wheel wells; and
    a fourth strake disposed on the underbody opposite the second strake adjacent to the third strake, the fourth strake including a housing having a leading portion positioned proximate the second lateral edge of the underbody and adjacent the third strake, a trailing portion extending toward the central region of the underbody and at least one aerodynamic surface extending between the leading portion and the trailing portion, wherein the third strake and the fourth strake cooperate to define a region therebetween receiving the airflow from the at least one aerodynamic surface of the third strake,
    wherein the at least one aerodynamic surface of the fourth strake directs airflow from the third strake and the region between the third strake and the fourth strake to the second end of the vehicle body.

3. The vehicle of claim 2 wherein the at least one aerodynamic surface extending between the leading portion and the trailing portion of the third strake and the leading portion and the trailing portion of the fourth strake further comprises a cambered airfoil.

4. The vehicle of claim 2 wherein the third strake and fourth strake of the at least one aerodynamic member are integrally formed into the underbody.

5. The vehicle of claim 1 further comprising a diffuser assembly disposed proximate the second end of the vehicle body on the underbody.

6. The vehicle of claim 5 wherein the diffuser assembly cooperates with the at least one aerodynamic member to accelerate the airflow pattern through the underbody to generate a downforce on the vehicle improve the aerodynamic profile of the vehicle body.

7. The vehicle of claim 1 wherein the first strake and second strake of the at least one aerodynamic member are integrally formed into the underbody.

8. The vehicle of claim 1 wherein the at least one aerodynamic surface extending between the leading portion and the trailing portion of the first strake and the leading portion and the trailing portion of the second strake further comprises a cambered airfoil.

9. A vehicle comprising:
    a vehicle body having a first end and an opposing second end, wherein the first end is configured to face oncoming airflow when the vehicle is in motion relative to a road surface;
    an underbody extending between the first and second ends of the vehicle body and defining a space between the vehicle body and the road surface, the underbody including a first lateral edge, an opposing second lateral edge and a central region defined therebetween;
    one or more wheel wells provided in the underbody proximate the first end of the vehicle body;
    a first strake disposed on the underbody including a housing having a leading portion positioned proximate the first lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent the first strake to draw airflow from the first end of the vehicle body and the one or more wheel wells;
    a second strake disposed on the underbody adjacent to the first strake, the second strake including a housing having a leading portion positioned proximate the first lateral edge of the underbody and adjacent the first strake, a trailing portion extending toward the central region of the underbody and at least one aerodynamic surface extending between the leading portion and the trailing portion, wherein the first strake and the second strake cooperate to define a region therebetween receiving the airflow from the at least one aerodynamic surface of the first stake; and a diffuser assembly disposed on the underbody proximate the second end of the vehicle body, wherein the at least one aerodynamic surface of the second strake directs the airflow from the first strake and the region between the first strake and the second strake to the trailing portion of the second strake toward the diffuser assembly proximate the second end of the vehicle body, wherein the diffuser assembly accelerates the airflow through the space between the vehicle body and the road surface to improve vehicle performance.

10. The vehicle of claim 9 wherein the first and second strakes are integrally formed into the underbody.

11. The vehicle of claim 9 further comprising:

a third strake disposed on the underbody opposite the first strake, the third strake including a housing having a leading portion positioned proximate the second lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent the third strake to draw airflow from the first end of the vehicle body and the one or more wheel wells; and a fourth strake disposed on the underbody opposite the second strake adjacent the third strake, the fourth strake including a housing having a leading portion positioned proximate the second lateral edge of the underbody and adjacent the third strake, a trailing portion extending toward the central region of the underbody and at least one aerodynamic surface extending between the leading portion and the trailing portion, wherein the third strake and the fourth strake cooperate to define a region therebetween receiving the airflow from the first end of the at least one aerodynamic surface of the third strake, wherein the at least one aerodynamic surface of the fourth strake directs airflow from the third strake and the region between the third strake and the fourth strake to the second end of the vehicle body.

12. The vehicle of claim 11 wherein the third and fourth strakes are integrally formed into the underbody.

13. The vehicle of claim 11 wherein the at least one aerodynamic surface extending between the leading portion and the trailing portion of the third strake and the leading portion and the trailing portion of the fourth strake further comprises a cambered airfoil.

14. The vehicle of claim 9 wherein the at least one aerodynamic surface extending between the leading portion and the trailing portion of the first strake and the leading portion and the trailing portion of the second strake further comprises a cambered airfoil.

15. A vehicle comprising:

a vehicle body having a first end and an opposing second end, wherein the first end is configured to face oncoming airflow when the vehicle is in motion relative to a road surface;

an underbody extending between the first and second ends of the vehicle body and defining a space between the vehicle body and the road surface, the underbody including a first lateral edge, an opposing second lateral edge and a central region defined therebetween;

one or more wheel wells provided in the underbody proximate the first end of the vehicle body; and at least one aerodynamic member disposed on the underbody adjacent the one or more wheel wells proximate the first end of the vehicle body, the at least one aerodynamic member including:

a first strake disposed on the underbody including a housing having a leading portion positioned proximate the first lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent the first strake to draw airflow from the first end of the vehicle body and the one or more wheel wells, a second strake disposed on the underbody adjacent to the first strake, the second strake including a housing having a leading portion positioned proximate the first lateral edge of the underbody and adjacent the first strake, a trailing portion extending toward the central region of the underbody and at least one aerodynamic surface extending between the leading portion and the trailing portion, wherein the first strake and the second strake cooperate to define a region therebetween receiving the airflow from the at least one aerodynamic surface of the first strake, wherein the at least one aerodynamic surface of the second strake directs the airflow from the first strake and the region between the first strake and the second strake to the trailing portion of the second strake toward the second end of the vehicle, a third strake disposed on the underbody opposite the first strake, the third strake including a housing having a leading portion positioned proximate the second lateral edge of the underbody and the one or more wheel wells, a trailing portion positioned proximate the central region of the underbody and at least one aerodynamic surface extending between the leading portion and the trailing portion, wherein the at least one aerodynamic surface creates a low pressure area adjacent the third strake to draw airflow from the first end of the vehicle body and the one or more wheel wells, and a fourth strake disposed on the underbody opposite the second strake adjacent to the third strake, the fourth strake including a housing having a leading portion positioned proximate the second lateral edge of the underbody and adjacent the third strake, a trailing portion extending toward the central region of the underbody and at least one aerodynamic surface extending between the leading portion and the trailing portion, wherein the at least one aerodynamic surface of the fourth strake directs airflow from the third strake and the region between the third strake and the fourth strake to the second end of the vehicle body; and a diffuser assembly disposed on the underbody proximate the second end of the vehicle body, wherein the diffuser assembly further comprises a panel that accelerates the airflows directed from the first and second strakes and the opposing third and fourth strakes through the space between the vehicle body and the road surface to improve vehicle performance.

16. The vehicle of claim 15 wherein the first and second strakes are integrally formed into the underbody.

17. The vehicle of claim 15 wherein the first and second strakes are integrally formed into the underbody.

18. The vehicle of claim 15 wherein the at least one aerodynamic surface extending between the leading portion and the trailing portion of the first strake and the leading portion and the trailing portion of the second strake further comprises a cambered airfoil.

19. The vehicle of claim 15 wherein the at least one aerodynamic surface extending between the leading portion and the trailing portion of the third strake and the leading portion and the trailing portion of the fourth strake further comprises a cambered airfoil.

\* \* \* \* \*

UNITED STATES PATENT AND TRADEMARK OFFICE
CERTIFICATE OF CORRECTION

PATENT NO. : 10,053,163 B1
APPLICATION NO. : 15/638900
DATED : August 21, 2018
INVENTOR(S) : Steven A. Del Gaizo et al.

Page 1 of 1

It is certified that error appears in the above-identified patent and that said Letters Patent is hereby corrected as shown below:

In the Claims

Column 11, Line 5, in Claim 9, "surface of the first stake; and" should read --surface of the first strake; and;--

Signed and Sealed this
Thirtieth Day of October, 2018

Andrei Iancu
*Director of the United States Patent and Trademark Office*